United States Patent [19]

Shiraki

[11] Patent Number: 4,894,572
[45] Date of Patent: Jan. 16, 1990

[54] DISK-TYPE BRUSHLESS FAN MOTOR
[75] Inventor: Manabu Shiraki, Yamato, Japan
[73] Assignee: Shicoh Engineering Co., Ltd., Kanagawa, Japan
[21] Appl. No.: 924,903
[22] Filed: Oct. 30, 1986

[30] Foreign Application Priority Data

Feb. 19, 1986 [JP] Japan .............................. 61-23420[U]

[51] Int. Cl.$^4$ ........................................... H02K 11/00
[52] U.S. Cl. ................... 310/68 B; 310/156; 310/179; 310/269; 318/254
[58] Field of Search ............ 310/68 R, 43, 68 B, 310/46, 62, 152, 154, 156, 179, 63, 177, 208, 258, 184, DIG. 3, 180, DIG. 6, 198, 268, 71; 318/254

[56] References Cited

U.S. PATENT DOCUMENTS

| | | | |
|---|---|---|---|
| 3,579,277 | 5/1971 | Imahashi | 310/68 R |
| 3,961,211 | 6/1976 | Vergues | 318/254 |
| 4,125,792 | 11/1978 | Schmider | 318/254 A |
| 4,164,690 | 8/1970 | Muller | 318/254 A |
| 4,394,594 | 7/1983 | Schmider | 318/254 |
| 4,481,436 | 11/1984 | Renaud | 310/68 B |

FOREIGN PATENT DOCUMENTS

| | | |
|---|---|---|
| 0163142 | 4/1985 | European Pat. Off. . |
| 0071166 | 5/1980 | Japan . |
| 0032352 | 2/1984 | Japan . |
| 0113643 | 6/1985 | Japan . |

Primary Examiner—R. Skudy
Attorney, Agent, or Firm—Wegner & Bretschneider

[57] ABSTRACT

A disk-type brushless fan motor comprises a stator yoke having a suitable cutaway portion formed therein for allowing generation of a cogging torque to allow self-starting of a magnet rotor of the motor. A printed circuit board underlies the stator yoke, and a position detecting element is located on a face of the printed circuit board opposing to the cutaway portion of the stator yoke. The printed circuit board has one or more small cutaway portions formed along an outer periphery thereof within a range of the cutaway portion of the stator yoke, and opposite leads or terminals of a pair of armature coils located on the stator yoke extend through the cutaway portions of the printed circuit board in order to establish electric connection to electric parts located on the rear side of the printed circuit board.

9 Claims, 6 Drawing Sheets

DISK-TYPE BRUSHLESS FAN MOTOR

BACKGROUND OF THE INVENTION

1. Field of the Invention

This invention relates to a single-phase disk-type brushless fan motor employing a single-phase disk-type brushless motor which can start itself.

2. Description of the Prior Art

In recent years, brushless motors are widely used owing to their high reliability in addition to their characteristics as dc motors that a torque is high relative to their size and the controllability is high.

Particularly, disk-type brushless motors (also called flat motors) having an axial gap structure wherein an axial air gap is involved are widely used in office automation appliances because they can readily be flattened.

However, brushless motors have a drawback that they are expensive because they require, for each of phases thereof, a circuit (a driving or an energization controlling circuit) for switching energization of armature coils in response to a signal from a position detecting element such as a Hall effect element which detects an N (north) or S (south) magnetic pole of a magnet rotor.

Accordingly, it is unwise to use such an expensive brushless motor as a fan motor which is used to blow a wind for cooling an object.

In order to resolve this drawback, a single-phase (single-phase energized) brushless motor which requires only one position detecting element and a single energization switching circuit, and hence can be produced at a low cost, is used as a fan motor.

Such a single-phase brushless motor has a so-called dead point at an energization switching point at which no torque is produced.

Therefore, a single-phase brushless motor is normally provided with a cogging generating magnetic member (an iron piece is mainly used therefor) for generating a torque (cogging torque also called a reluctance torque) in addition to an electromagnetic torque generated by an armature coil and a magnet rotor (field magnet) in order to eliminate such dead points and to allow self-starting of the motor.

Figure 1:
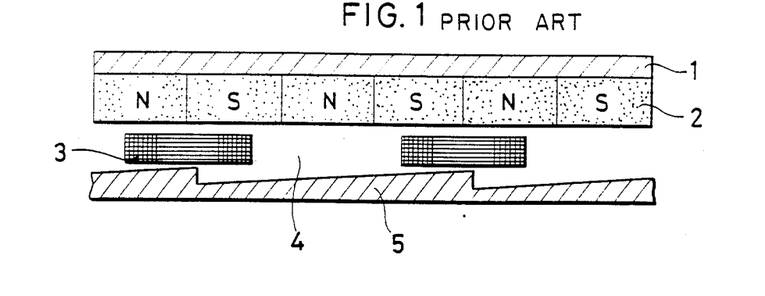
FIGS. 1 and 2 are schematic illustrations of conventional single-phase brushless motors illustrating different principles of generating a cogging torque.

In a coreless motor, for example, the following methods for generating a cogging torque are known. Referring first to FIG. 1, a 6-pole field magnet or magnet rotor 2 having an alternate arrangement of 6 N and S magnetic poles or pole zones is mounted on a rotor yoke 1 in an opposing relationship to a stator yoke 5 with an air gap 4 left therebetween and with a pair of coreless armature coils 3 disposed in the air gap 4. In the motor of FIG. 1, the stator yoke 5 has at a face thereof opposing the field magnet 2 two inclined surfaces which thus define the complementarily inclined air gap 4. This method, however, has drawbacks that the motor is relatively inefficient because the air gap is relatively great and that the construction of the motor is complicated and hence costly.

Figure 2:
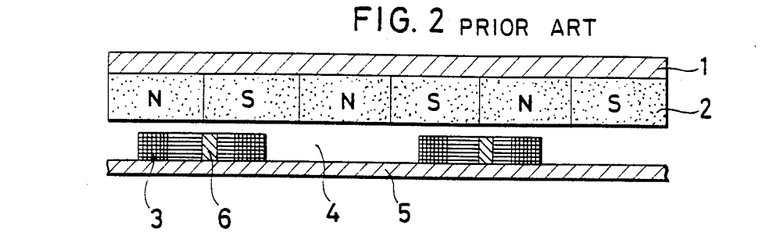
Figure 3:
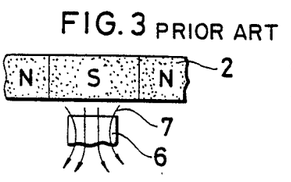
FIG. 3 is a schematic illustration showing a stopping position of the motor of FIG. 2.

Referring now to FIG. 2, another method is illustrated. In the motor of FIG. 2, an iron bar 6 is mounted on a stator yoke 5 and extends through each of a pair of coreless armature coils 3 disposed in a uniform air gap 4 defined by the stator yoke 5 and a field magnet or magnet rotor 2 on a rotor yoke 1. According to this arrangement, a magnetic flux will appear as seen in FIG. 3 and hence the field magnet 2 will stop at a position in which the iron bars 6 are each opposed to the center of one of the N and S poles of the magnet rotor 2. Accordingly, if the armature coils 3 are located so as to generate a turning torque in such a stopping position of the magnet rotor 2, a coreless motor which can start itself will be obtained.

Figure 4:
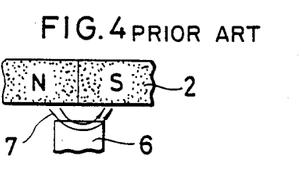
FIG. 4 is a similar view but illustrating a magnetic flux around a dead point of the motor of FIG. 2.

However, the method as shown in FIG. 2 has a drawback that if the thickness of the iron bars 6 is increased in order to increase the cogging torque to assure self-starting of the motor, the cogging torque around the dead points will decrease because the magnetic flux 7 will act as shown in FIG. 4 around the dead points and the cogging torque will be combined magnetically with magnetic flux 7.

Figure 5:
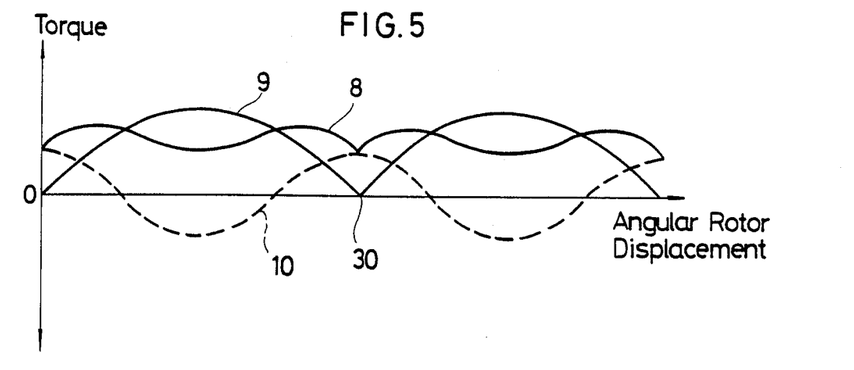
FIG. 5 is a graph showing an ideal composite torque curve for a single-phase brushless motor.

In order to obtain an ideal torque—angular rotor displacement curve, it is necessary to obtain a composite torque curve 8 as shown in FIG. 5. In FIG. 5, an armature coil torque (electromagnetic torque) curve by an armature coil is indicated by a curve 9 while a cogging (reluctance) torque curve by a cogging generating magnetic member is indicated by a curve 10. As apparent from the armature coil torque curve 9 and the cogging torque curve 10, the cogging torque should be a half of the armature coil torque in magnitude. By this means, the torque curve 8 composite of the armature coil torque and the cogging torque will exhibit a substantially uniform rotational torque over the entire range of rotation. In order to obtain such an ideal composite torque curve 8, a cogging generating magnetic member (such as the iron bars 6) must be designed correctly in size and location.

On the contrary, if a single-phase brushless motor constructed in such a principle as illustrated in FIGS. 1 and 2 has no inclined air gap nor iron bar for generating a cogging torque, a torque curve 9 as shown in FIG. 5 is obtained by an armature coil. This torque curve 9 indicates that such a single-phase brushless motor has a so-called dead point at an energization switching point 30 at which no torque is generated. As described hereinabove, if a position detecting element is located opposite a dead point when the magnet roter 2 is stopped, energization of the motor will result in generation of no turning torque. Accordingly, the motor is not suitable for practical use.

Figure 6:
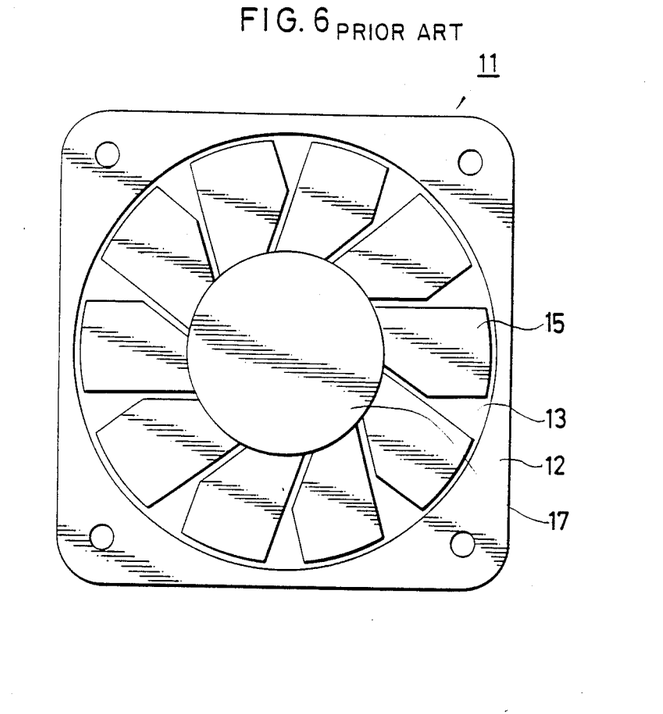
FIG. 6 is a plan view of a further conventional single-phase disk-type brushless fan motor.

FIGS. 6 to 10 illustrate a fan motor in to which a typical single-phase brushless motor, wherein an ideal turning torque can be obtained, is used. FIG. 6 is a plan view of a single-phase disk-type brushless fan motor, FIG. 7 a vertical sectional view of the motor, FIG. 8 a bottom plan view of a magnet rotor of the motor, FIG. 9 an enlarged vertical sectional view of a stator of the motor, and FIG. 10 a plan view of a stator armature of the motor.

Figure 7:
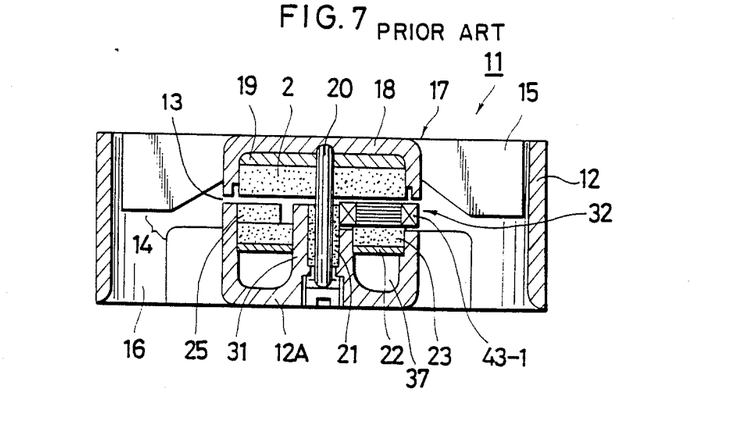
FIG. 7 is a vertical sectional view of the motor of FIG. 6.

The single-phase disk-type brushless fan motor generally denoted at 11 includes a motor case 12A located at the center of a fan motor casing 12 having a substantially square shape in plan. A plurality of stays not shown extend between and interconnect the motor case 12A and the fan motor casing 12, and a same number of windows 16 for passing a wind therethrough are defined by the stays between the motor case 12A and the fan motor casing 12. The motor case 12A has a bearing holder or hub 31 formed at the center thereof and extending upwardly therefrom. A bearing 21 is securely fitted in the bearing holder 31, and a rotary shaft 20 is supported for rotation by means of the bearing 21. A rotary fan 17 is securely mounted at the top of the rotary shaft 20 and has a plurality of fan blades 15 formed integrally around an outer periphery of a body 18 thereof for blowing a wind axially toward and through the windows 16.

Figure 8:
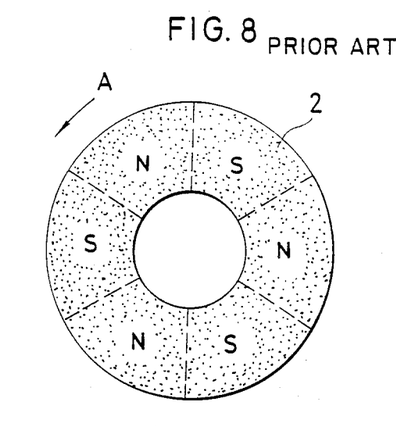
FIG. 8 is a bottom plan view, in diagrammatic representation, of a magnet rotor of the brushless fan motor of FIG. 6.

A rotor yoke 19 is secured to the back side of the rotary fan body 18, and a magnet rotor 2 is secured to the back side of the rotor yoke 19. The magnet rotor 2 may have 2P (P is an integer equal to or greater than 2) alternate N and S magnetic poles or pole zones, and in the arrangement shown, the magnet rotor 2 is an annular 6-pole magnetic rotor with each magnetic pole magnetized over an angular width of 60 degrees, as illustrated in FIG. 8.

A stator armature 32 is located in an opposing relationship to the magnet rotor 2 with an axial air gap 13 defined therebetween.

Figure 9:
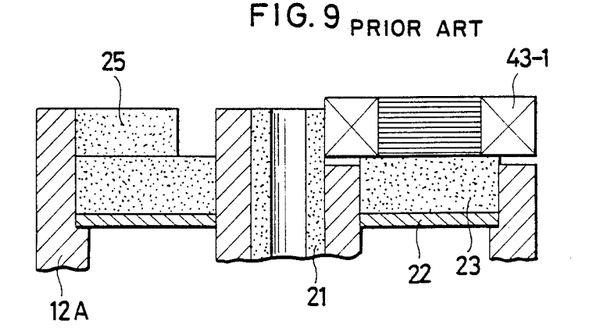
FIG. 9 is an enlarged partial vertical sectional view of a stator armature of the brushless motor of FIG. 6.
Figure 10:
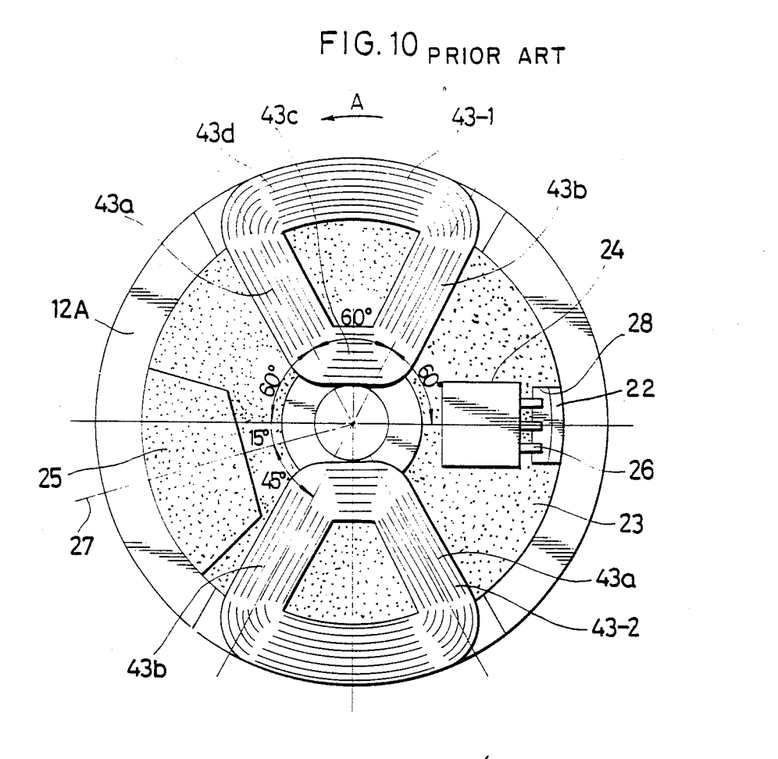
FIG. 10 is a plan view of the stator armature of FIG. 9.

Thus, the single-phase disk-type brushless motor 11 is comprised mainly of the rotatably supported rotor yoke 19, the magnet rotor 2, the stator armature 32, and a position detecting element 24 which will be hereinafter described. The stator armature 32 includes a stator yoke 23 and a pair of coreless armature coils 43-1, 43-2 mounted on an upper face of the stator yoke 23 opposing to the magnet rotor 2. The armature coils 43-1, 43-2 are located at symmetrical positions spaced by an angle of 180 degrees from each other relative to the center of the stator yoke 23 as seen in FIG. 10. A position detecting element 24 such as a Hall effect element and a cogging generating magnetic projection 25 are also located on the upper face of the stator yoke 23. Meanwhile, a printed circuit board 22 is located on a lower face of the stator yoke 23. A spacing 37 for accommodating therein electric parts which constitute an energization controlling circuit (not shown) is defined below the circuit board 22.

The armature coils 43-1, 43-2 are of the coreless type and each have a pair of radially extending, magnetically active conductor portions 43a, 43b which contribute to generation of a torque and include an angular width equal to the angular width of each magnetic pole of the magnet rotor 2, that is, an angular width of 60 degrees, in order to constitute the motor 11 as a single-phase brushless motor.

The cogging torque generating magnetic projection 25 formed on the upper face of the stator yoke 23 has an angular width substantially equal to the angular width of each magnetic pole of the magnet rotor 2 (60 degrees in mechanical angle) and is located such that its radial center line between the angular width is displaced rearwardly by an electrical angle of 90 degrees (45 degrees in magnetic angle and also in mechanical angle) from the magnetically active conductor portion 43b of one of the armature coils, for example, the armature coil 43-2, in a direction of rotation of the magnet rotor 2 (in a direction indicated by an arrow mark A).

Meanwhile, the position detecting element 24 is located at a substantially central position between the magnetically active conductor portion 43b of the armature coil 43-1 and the magnetically active conductor portion 43a of the armature coil 43-2 and has three terminals 26 which extend through a cutaway portion 28 formed in the the stator yoke 23 and are electrically connected to the printed circuit board 22 underlying the stator yoke 23.

According to the single-phase disk-type brushless fan motor 11 having such a construction as described above, the magnet rotor 2 can start itself and rotate in the direction of the arrow mark A without fail with the only one position detecting element 24.

However, if the single-phase disk-type brushless fan motor 11 does not include such a cogging torque generating magnetic projection 25, a torque curve obtained by the armature coils 43-1, 43-2 will be such as denoted at 9 in FIG. 5, and this torque curve 9 apparently indicates a dead point at an energization switching point 30 at which no torque is generated.

Accordingly, if the position detecting element 24 stops at a position in which it opposes to a dead point when the magnet rotor 2 stops, energization of the motor 11 will not result in generation of a starting torque. Thus, such a motor is not suitable for practical use.

Therefore, the cogging torque generating magnet projection 25 is provided at such a specific location as seen in FIG. 10 in order to obtain a cogging torque curve 10 as shown in FIG. 5. The cogging torque as indicated by the cogging torque curve 10 is generated by an attracting force between the projection 25 and the magnet rotor 2 and is preferably about one half of the armature coil torque curve 9 in magnitude.

A composite torque between the torque curves 9 and 10 will be such as shown by the composite torque curve 8, and thus the single-phase disk-type brushless fan motor 11 will have no dead point.

However, the single-phase disk-type brushless fan motor 11 has a drawback that the cost of parts and the assembling man-hours are high because the projection 25 must be mounted on the upper face of the stator yoke 23. Besides, the cutaway portion 28 must be formed in the stator yoke 23 and electric parts located on the printed circuit board 22 underlying the stator yoke 23 must be connected to the armature coils 43-1, 43-2 on the stator yoke 23 by means of wires extending through the cutaway portion 28 formed in the stator yoke 23. In this instance, insufficient insulation of the stator yoke 23 may cause short-circuiting, and hence the motor is not suitable for mass-production.

SUMMARY OF THE INVENTION

It is an object of the present invention to provide a single-phase disk-type brushless fan motor which eliminates such drawbacks of conventional single-phase brushless fan motors and which can start itself without provision of a special member for generating a cogging torque and prevent short-circuiting between an armature coil and another electric part installed therein.

It is another object of the invention to provide a single-phase disk-type brushless fan motor wherein a position detecting element can be readily assembled and electric connection between an armature coil and an energization controlling circuit therefore can be established readily and assured without causing short-circuiting therebetween.

It is a further object of the invention to provide a single-phase disk-type brushless fan motor which is reduced in overall weight and production cost and easy to assemble and which can prevent short-circuiting between electric parts installed therein.

In order to attain the objects, according to the present invention, there is provided a disk-type brushless fan motor, comprising a rotatably mounted magnet rotor having 2P (P is an integer equal to or greater than 1) alternate north and south poles, a stator yoke located in an opposing relationship to said magnet rotor with an axial air gap left therebetween, one or more coreless armature coils secured to said stator yoke, an energization controlling circuit for detecting a magnetic pole of said magnet rotor to switchably energize said armature coils, said stator yoke having a cutaway portion formed therein for allowing self-starting of said brushless fan motor, a printed circuit board located on a lower face of said stator yoke, said energization controlling circuit including an electric part located on a lower face of said printed circuit board, and a position detecting element located at a face of said printed circuit board opposing to said cutaway portion of said stator yoke and in an opposing relationship to said magnet rotor, said printed circuit board having one or more cutaway portions formed along an outer periphery thereof within a range of said cutaway portion of said stator yoke, opposite leads of said armature coils extending through said one or more cutaway portions of said printed circuit board so as to establish electric connection with said electric part on the lower face of said printed circuit board.

DESCRIPTION OF THE PREFERRED EMBODIMENTS

Figure 11:
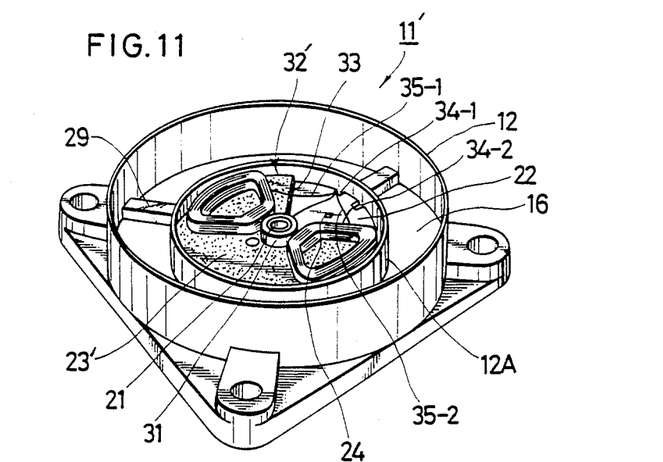
FIG. 11 is a perspective view of a single-phase disk-type brushless fan motor according to an embodiment of the present invention, with a rotary fan removed.
Figure 12:
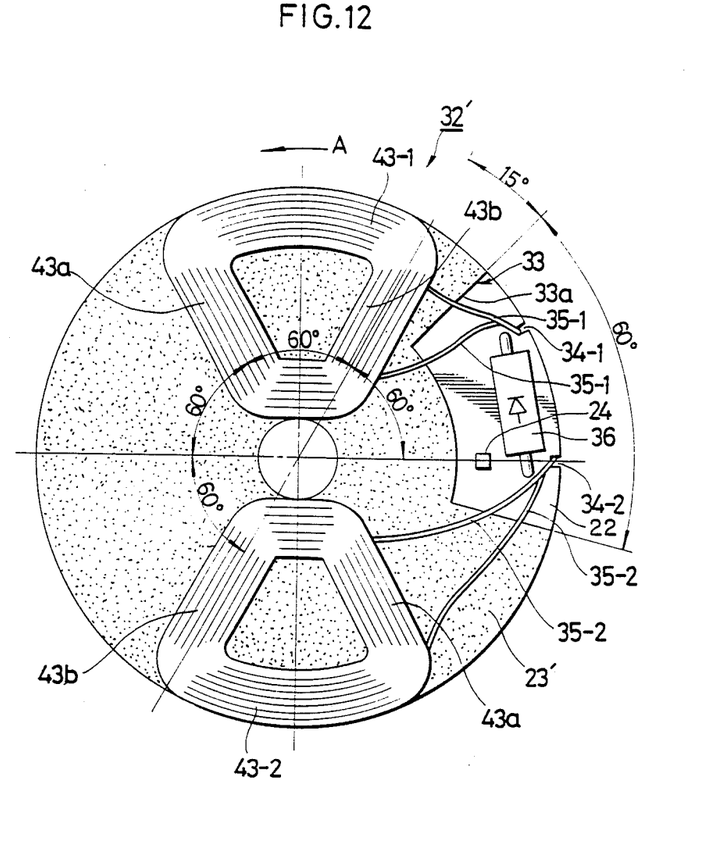
FIG. 12 is an enlarged plan view of a stator armature of the brushless fan motor of FIG. 11.

Referring to FIGS. 11 and 12, a single-phase disk-type brushless fan motor according to the present invention is shown. It will be appreciated that the brushless fan motor shown in FIGS. 11 and 12 has a similar construction to that of the conventional single-phase brushless fan motor 11 shown in FIGS. 6 to 10 except those portions particularly described below and is shown with a rotor including a fan omitted. Thus, in FIGS. 11 and 12, like parts or components are denoted by like reference numerals to those of the brushless fan motor of FIGS. 6 to 10, and where such parts or components are somewhat modified, they are denoted by like reference numerals with a mark ' appended thereto. Thus, the single-phase disk-type brushless fan motor is generally denoted at 11' in FIGS. 11 and 12.

The single-phase brushless fan motor 11' includes a motor case 12A located at the center of and connected to a fan motor casing 12 by a plurality of stays 29 located at the bottom of the motor 11' and defining therein a same number of windows 16 between the motor case 12A and the fan motor casing 12 for allowing a wind blown by a fan not shown to pass outwardly therethrough. A bearing holder or hub 31 is provided at the center of and extends upwardly from the motor case 12A, and a bearing 21 is securely fitted in the bearing holder 31 and supports a rotary shaft (not shown but similar to that depicted in FIG. 7) for rotation thereon. A rotary fan is secured to the top of the rotary shaft and has a body and a plurality of fan blades provided on an outer periphery of the body for blowing a wind axially toward and through the windows 16.

A rotor yoke is secured to the back side of the rotary fan body, and a magnet rotor is secured to the back side of the rotor yoke. The magnet rotor may have 2P (P is an integer equal to or greater than 1) alternate N and S magnetic poles or pole zones and may be, for example, such a magnet rotor having 6 magnetic poles as illustrated in FIG. 8.

The construction of the motor 11' described above is similar to that of the conventional motor 11 described hereinabove with reference to FIGS. 6 to 10, as mentioned above.

A stator armature 32' is located in an opposing relationship to the magnet rotor with an axial air gap defined therebetween.

Thus, the single-phase disk-type brushless motor 11' is comprised mainly of the rotatably supported rotor yoke, the magnet rotor, the stator armature 32', and a position detecting element 24. The stator armature 32' includes a stator yoke 23' and a pair of coreless armature coils 43-1, 43-2 mounted on an upper face of the stator yoke 23' opposing to the magnet rotor. The armature coils 43-1, 43-2 are located at symmetrical positions spaced by an angle of 180 degrees from each seen in FIG. 12. Meanwhile, a printed circuit board 22 for locating electric parts on a lower face thereof is located on a lower face of the stator yoke 23'. The stator yoke 23' has a single cutaway portion 33 formed therein and having at least one end extending in a substantially radial direction of the stator yoke 23' for enabling self-starting of the brushless fan motor 11'. Accordingly, the printed circuit board 22 is exposed through the cutaway portion 33 of the stator yoke 23' as seen in FIG. 11 and 12.

Thus, the position detecting element 24 is located on a portion of an upper face of the printed circuit board 22 exposed through the cutaway portion 33 of the stator yoke 23' in order that the position detecting element 24 may be allowed to detect a magnetic pole of the magnet rotor.

The cutaway portion 33 formed in the stator yoke 23' must be such a specific one as may allow generation of a cogging torque which allows self-starting of the brushless fan motor 11' and allows production of such an ideal composite torque curve as indicated by the curve 8 in FIG. 5.

In order to allow production of such an ideal composite torque curve 8, the cutaway portion 33 of the stator yoke 23' is required to have an angular width of n·T where T is the angular width of each magnetic pole or pole zone of the magnet rotor, and n is an integer equal to or greater than 1 but equal to or smaller than the number of the magnet poles or pole zones of the magnet rotor.

It will be appreciated that in the present embodiment the cutaway portion 33 has an angular width equal to the full angular width of each magnetic pole zone of the magnet rotor, that is, an angular width of 60 degrees because the magnet rotor has 6 magnetic pole zones as described above.

The length of the cutaway portion 33 in a radial direction is suitably selected such that the maximum value of the cogging torque may be about one half of the maximum torque as obtained by the generated torque curve 9 shown in FIG. 5. To this end, the radial length of the cutaway portion 33 is about one half of a radius of the stator yoke 23' as seen in FIG. 12.

The location of the stator yoke 23' having the cutaway portion 33 relative to the armature coils 43-1, 43-2 may be such that one circumferential end 33a of the cutaway portion 33 is within a range from a position at which a maximum torque is obtained (or a position providing a dead point) to another position spaced in a direction opposite to the direction of rotation of magnet rotor 2, namely, opposite the direction indicated by arrow A in FIG. 8.

Especially, in order for the brushless fan motor 11' to generate a torque in accordance with the desirable composite torque curve 8, the stator yoke 23' should be located such that one of opposite circumferential ends, for example, the end 33a, of the cutaway portion or a notch 33 be at a position spaced rearwardly by an angular distance equal to about one fourth and up to about one half, of the angular width of each pole zone of the magnet rotor from a position at which a maximum torque can be obtained in a direction of rotation of the magnet rotor (that is, a direction indicated by an arrow mark A in FIG. 12).

Thus, in the present embodiment, the stator yoke 23' is located such that the circumferential end 33a of the cutaway portion 33 thereof is at a position spaced rearwardly by an angular distance equal to one fourth of the full pole width of the magnet rotor, that is, by an angle of 15 degrees, from the magnetically active conductor portion 43b of the armature coil 43-1 toward in the direction of rotation of the magnet rotor (in the direction of the arrow mark A).

The printed circuit board 22 has a pair of small cutaway portions 34-1, 34-2 formed along an outer periphery of a portion thereof opposing to the cutaway portion 33 of the stator yoke 23'. Thus, opposite terminals or leads 35-1, 35-2 of the cutaway portion 33 of the stator yoke 23' and their corresponding armature coils 43-1, 43-2 extend through the cutaway portions 34-1, 34-2, to the rear side of the printed circuit board 22 and are electrically connected to electric parts not shown located on the rear side of the printed circuit board 22 by way of a printed wiring pattern formed on the rear side of the printed circuit board 22.

According to the single-phase disk-type brushless fan motor 11' having such a construction as described above, the magnet rotor can start itself with a single position detecting element and can rotate in the direction of the arrow mark A in FIG. 12 without fail because a circumferential end of the cutaway portion 33 of the stator yoke 23', for example, the circumferential end 33a, is attracted by and hence opposed to a central portion of an N or S pole of the magnet rotor 2 and accordingly the position detecting element 24 normally detects another N or S magnetic pole when the magnet rotor is in a stopped condition.

In addition to the position detecting element 24, a tall electric part such as a part 36 as shown in FIG. 12 can be located on the portion of the printed circuit board 22 opposing to the cutaway portion 33 of the stator yoke 23'.

Figure 13:
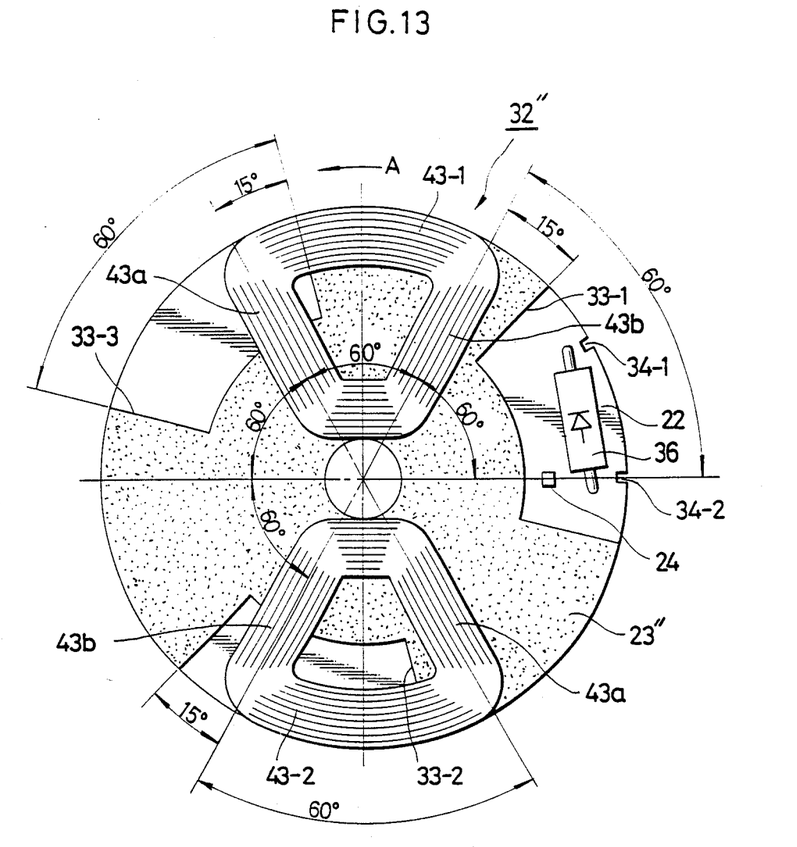
FIG. 13 is a similar view but showing a stator armature according to another embodiment of the invention.

Referring now to FIG. 13, there is illustrated a stator armature according to another embodiment of the present invention. Also in FIG. 13, like parts or components are denoted by like reference numerals to those of the brushless motors of FIGS. 6 to 10 and FIGS. 11 and 12, but here, modified parts or components are denoted by like reference numerals with a mark " appended thereto. Thus, the stator armature shown in FIG. 13 is denoted at 32".

The stator armature 32" includes a stator yoke 23" having 3 cutaway portions 33-1, 33-2, 33-3 formed therein. The cutaway portions 33-1, 33-2, 33-3 have an angular width substantially equal to the angular width of each magnetic pole or pole zone of a magnet rotor and are equally spaced apart by an angular distance equal to a total angular width of an even number (2 in the arrangement of FIG. 13) of magnetic poles of the magnet rotor in order to cancel radial loads to the stator armature 32" to each other.

According to this arrangement, when, for example, an N magnetic pole zone of the magnet rotor coincides fully with one of the cutaway portions 33-1, 33-2, 33-3, the other N magnetic pole zone coincide with the other cutaway portions. Accordingly, attracting forces to the stator yoke 23" are well balanced and hence no radial load will appear, resulting in low friction and long life of a bearing of the motor.

It is to be noted that the cutaway portion 33 or portions 33-1, 33-2, 33-3 described above can be formed simultaneously with formation of the stator yoke 23' or 23" by stamping. Accordingly, little cost will be required for formation of such cutaway portion or portions.

It is also to be noted that a disk-type brushless fan motor according to the present invention may include a greater number of armature coils located on a stator yoke because the stator yoke has no projection thereon and a position detecting element can be located in a cutaway portion of the stator yoke. This is particularly effective where armature coils are formed into so-called sheet coils, for example, by a technique of etching.

What is claimed is:

1. A single-phase disk-type brushless fan motor, comprising:
   a rotatably mounted magnet rotor having 2P alternate north and south poles, P being an integer equal to or greater than 1;
   a stator yoke provided in an opposing relationship to said magnet rotor with an axial air gap left therebetween;
   at least one coreless armature coil provided at a same-phase position on said stator yoke;
   at least one cutaway portion formed in said stator yoke at a position for allowing self-starting of said brushless fan motor;
   a printed circuit board provided on a lower face of said stator yoke;
   an energization controlling circuit provided on a lower face of said printed circuit board for detecting a magnetic pole of said magnet rotor to switchably energize said coreless armature coil;
   a position-detecting element for detecting a magnetic pole of said magnet rotor said position-detecting element being provided on an upper face of said printed circuit board at a region opposing said magnet rotor through said cutaway portion of said stator yoke; and cutaway means formed in said printed circuit board at said region for allowing opposite leads of said coreless armature coil to extend therethrough, so that said opposite leads of said coreless armature coil are guided through said cutaway portion of said stator yoke and through said cutaway means to said lower face of said printed circuit board and are connected electrically to said energization controlling circuit.

2. A single-phase disk-type brushless fan motor as claimed in claim 1, wherein said means comprises at least one notch formed in an outer peripheral edge of said printed circuit board at said region.

3. A single-phase disk-type brushless fan motor as claimed in claim 1, wherein at least two cutaway portions are formed in said stator yoke at equal angular intervals.

4. A single-phase disk-type brushless fan motor as claimed in claim 3, wherein said at least two cutaway portions are located at intervals of an even integer multiple of the angular width of each pole of said magnet rotor.

5. A single-phase disk-type brushless fan motor as claimed in claim 1, wherein said at least one cutaway portion formed in said stator yoke has at least one end extending in a radial direction or a substantially radial direction of said stator yoke.

6. A single-phase disk-type brushless fan motor as claimed in claim 5, wherein said at least one cutaway portion has an angular width substantially equal to the angular width of each pole of said magnet rotor.

7. A single-phase disk-type brushless fan motor as claimed in claim 5, wherein said at least one end has a length such that a cogging torque produced by said cutaway portion is about one half of a maximum torque produced by energization of said coreless armature coil.

8. A single-phase disk-type brushless fan motor as claimed in claim 5, wherein said stator yoke is positioned such that said at least one end of said cutaway portion of said stator yoke is located at a position spaced rearwardly by an angular distance not greater than one half of the angular width of each pole of said magnet rotor from a position at which a maximum torque is obtained.

9. A single-phase disk-type brushless fan motor as claimed in claim 8, wherein said stator yoke is positioned such that said at least one end of said cutaway portion of said stator yoke is located at a position spaced rearwardly by an angular distance equal to about one fourth of the angular width of each pole of said magnet rotor from a position at which a maximum torque is obtained.

* * * * *